2,741,624 p,p'-OXYBIS(BENZENESULFONYLAZIDE) AND PROCESS

Byron A. Hunter, Waterbury, Conn., assignor to United States Rubber Company, New York, N. Y., a corporation of New Jersey No Drawing. Application August 30, 1954,
Serial No. 453,140

2 Claims. (Cl. 260—349)

This invention resides in the discovery of p,p'-oxybis (benzene sulfonyl azide) as a new and useful organic compound. This substance is possessed of unique properties which make it of particular value as a blowing agent for producing cellular compositions of rubber and plastics. The invention also relates to a simple and commercially feasible method of making this new chemical.

p,p'-Oxybis (benzene sulfonyl azide) can be readily prepared by treating p,p'-oxybis (benzene sulfonyl hydrazide) in acetic acid suspension with sodium nitrite. The parent substance, p,p'-oxybis (benzene sulfonyl hydrazide), (which is the subject of U. S. patent to Schoene No. 2,552,065) is also an excellent blowing agent for rubber and plastics. The latter material, however, produces water as one decomposition product, a feature which may be objectionable in certain applications. The compound of the present invention decomposes without the formation of water and is free from the limitation described. In addition, p,p'-oxybis (benzene sulfonyl azide) is considerably more soluble than the parent hydrazide in organic solvents as well as in plasticizers in common use with polyvinyl chloride (such as tricresyl phosphate and dicapryl phthalate). Further, p,p'-oxybis (benzene sulfonyl azide) is considerably more soluble in these materials than is diphenyl-4,4'-disulfonyl azide (U. S. patent to Ott No. 2,518,249).

The equation of formation is:

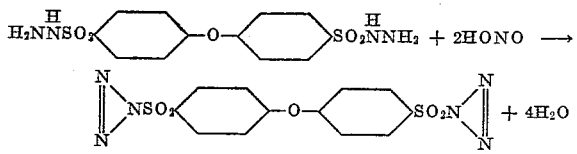

The sodium nitrite reacts with part of the acetic acid to provide the nitrous acid. Preferably the amount of sodium nitrite added is sufficient to give a ratio of mols of sodium nitrite to hydrazide groups substantially in excess of 1:1. Thus I prefer to use a molar ratio of sodium nitrite to the hydrazide compound considerably in excess of 2:1, conveniently 3:1. This use of excess sodium nitrite ensures reaction of all the comparatively expensive hydrazide compound. The amount of acetic acid should be sufficient to furnish a vehicle which will keep the reaction mixture fluent after all of the sodium nitrite has been reacted.

Instead of sodium nitrite I can use other alkali metal nitrites such as potassium or lithium nitrites, but I prefer sodium nitrite because of its lower cost.

I prefer to add the alkali metal nitrite gradually with stirring to the hydrazide suspension over a considerable period of time, say one hour. Preferably the suspension is initially at room temperature. The temperature gradually rises, as the nitrite is added, unless special cooling is provided. Ordinarily the temperature rises 20–40 degrees centigrade during the addition. Nitrous fumes representing a loss of nitrous acid are evolved and for this reason a substantial excess of nitrite should be used. After the nitrite has been added the reaction mixture is allowed to stand to ensure complete reaction, after which it is diluted with a large quantity of water to precipitate the product.

*Example I* p,p'-Oxybis (benzene sulfonyl hydrazide) (100 g., 0.28 moles) was suspended in 500 cc. (8.74 moles) of glacial acetic acid. The suspension was stirred as 58 g. (0.84 moles) of dry sodium nitrite was added over one hour. The temperature of the mixture rose to near 50° C. during the addition and some nitrous fumes were evolved. The mixture was then allowed to stand an additional hour and was then diluted with several volumes of water. The resulting crystalline product was filtered off, washed well with water and dried overnight. The dried product weighed 99 g. (95% yield) and melted at 94°–98° C. Recrystallization from alcohol raised the melting point to 97°–98° C.

*Analysis*—Per cent N calc. 16.8%, found 17.0%. Per cent S calc. 22.1%, found 22.2%.

*Example II*

A rubber composition was prepared as follows:

Natural rubber smoked sheet was broken down on a rubber mill until the Mooney viscosity had reached a value of 20–25. Compounding ingredients were then incorporated in accordance with the following recipe:

| | Parts by weight |
|---|---|
| Smoked sheets | 100.0 |
| Zinc oxide | 5.0 |
| Whiting | 30.0 |
| Lithopone | 30.0 |
| Stearic acid | 10.0 |
| #8 oil (hydrocarbon oil) | 10.0 |
| Sulfur | 3.0 |
| MBTS (benzothiazyl disulfide) | 1.0 |
| p,p'-Oxybis (benzene sulfonyl azide) | 1.5 |

The mixture was well blended on a rubber mill. Forty grams of the stock was placed in a circular mold (3# diameter, ¾" height) and cured for 30 minutes at 307° F. The resultant cured piece exhibited a fine and uniform cellular structure and good molding properties. The cellular product was light colored and odorless.

Having thus described my invention, what I claim and desire to protect by Letters Patent is:

1. p,p'-Oxybis (benzene sulfonyl azide).
2. A process of making p,p'-oxybis (benzene sulfonyl azide) which comprises adding dry sodium nitrite to an acetic acid suspension of p,p'-oxybis (benzene sulfonyl hydrazide).

References Cited in the file of this patent

UNITED STATES PATENTS

| 2,518,249 | Ott | Aug. 8, 1950 |
| 2,552,065 | Schoene | May 8, 1951 |
| 2,625,565 | Snell et al. | Jan. 13, 1953 |